United States Patent Office 3,535,607
Patented Oct. 20, 1970

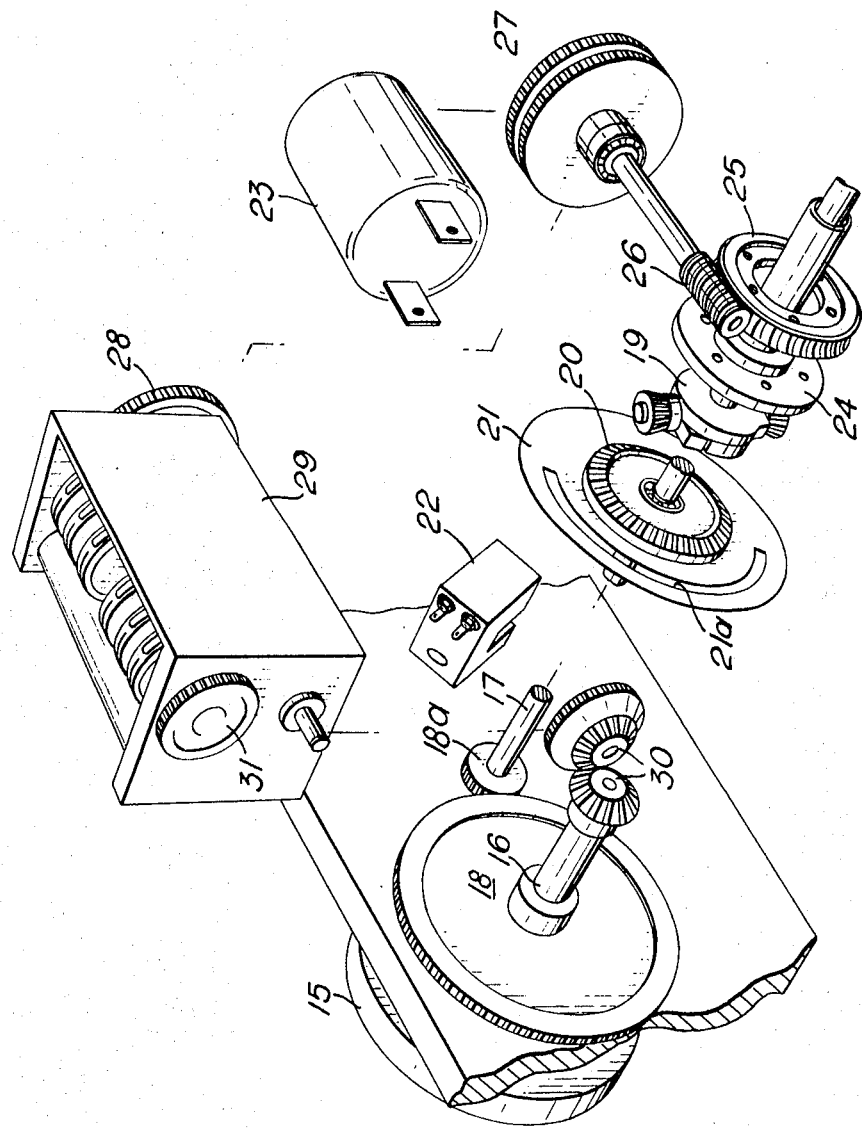
FIG. I

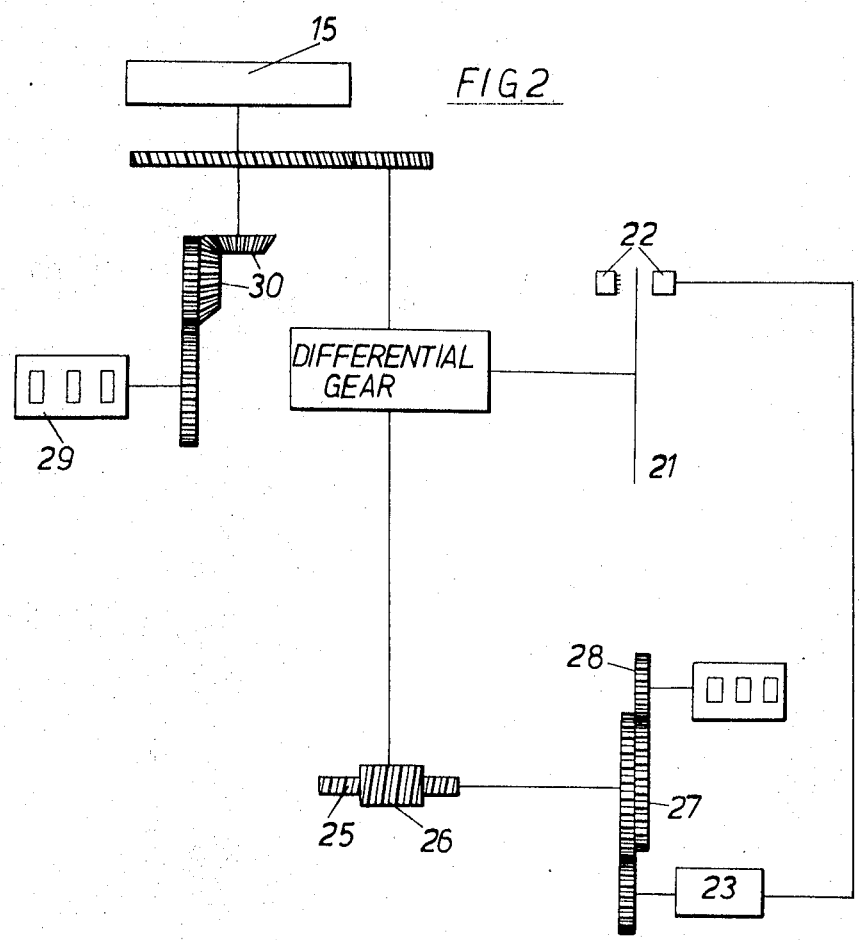

3,535,607
POSITION SERVO INCLUDING A DIFFERENTIAL GEAR DRIVING A PHOTOELECTRIC SHUTTER AS AN ERROR DETECTOR
Arthur K. Haslehurst, Northworthy, 11 Louvain Road, Derby, England
Filed Mar. 8, 1968, Ser. No. 711,777
Claims priority, application Great Britain, Mar. 11, 1967, 11,500/67
Int. Cl. G05b 11/14
U.S. Cl. 318—638       7 Claims

ABSTRACT OF THE DISCLOSURE

Displacement responsive apparatus comprises a shaft driven in correspondence with the displacement and connected to rotate the centre component of a differential gear. The centre component drives an outer component carrying a disc which interferes with the light falling on a photocell. The photocell causes a motor to drive the other outer component so as to return the disc to a datum position. The rotation of the motor, indicative of the displacement, is displayed on a counter.

---

The invention relates to apparatus responsive to displacement, and particularly to such apparatus for continuously indicating displacement by means, for example, of a digital display.

According to the invention, there is provided displacement indicating apparatus, comprising a member mounted for rotation in correspondence with a displacement to be indicated, a differential gear assembly comprising two outer components geared to a centre component, the centre component being coupled for rotation with the member, a motor drivingly coupled to one outer component, and control means responsive to movement of the other outer component from a datum position and operative to control the motor to drive the said one outer component in such a direction as tends to bring the other outer component back to the datum position, the length of angular movement of the said one outer component beng a measure of the said displacement.

A displacement indicating apparatus embodying the invention will now be described by way of example and with reference to the accompanying drawings, FIG. 1 of which is a schematic exploded perspective view of the apparatus. and FIG. 2 a schematic diagram of the system.

The apparatus is for indicating the displacement of an inextensible tape which may, for example, be connected at one end to part of a machine tool whereby to indicate the movement and position thereof.

The tape is led off a spool in a magazine (not shown) round a considerable arc of the circumference of a measuring drum 15, and thence to the machine tool, so that movement of the tape results in turning of the drum. The circumference of the drum 15 is such as to pass ten inches of tape for one complete revolution. The drum is fixed on a spindle 16 which is coupled to another spindle 17 through the medium of a 1:5 gear meachanism 18, 18a. This latter spindle 17 has fixed to it the centre component 19 of a differential gear assembly. One of the outer components 20, through which the shaft 17 freely passes, of the differential gear assembly has attached to it a disc 21, which is slotted at 21a (the slot having an angular length of 180°) whereby to control a light beam shining from a lamp towards a photosensitive device. The lamp and the photosensitive device are contained in a lamp and photocell unit 22, and positioned thereby on opposite sides of the disc 21 so that the light beam is either on or off according as to whether or not the slot 21a is positioned between the lamp and the device. Circuitry (not shown)

is arranged so that, when the light beam is interrupted, a motor 23 is caused to run and this motor now drives the other outer component 24 of the differential gear assembly in the approprate direction to restore the disc to the position in which the light beam is on again, whereupon the direction of the motor reverses. Thus, the motor 23 acts to bring the disc back to a zero or equilibrium position in which an end of the slot 21a is in line with the light path. Movement is transmitted from the motor through a 100:1 reduction gear mechanism comprising a worm wheel 25 and worm 26, which is itself directly coupled through gearing 27, 28 to a digital counter 29. The counter records the amount of rotation required for this restoration of the disc. Thus the amount of rotation of the drum 15 is communicated to the disc 21 and the disc is restored to the zero position by the given amount of rotation of the motor 23. The disc 21 may be in the form of a complete disc with a 180° slot or cutaway, as shown; alternatively it may be a 180° segment, as it is required to interrupt the light during one half revolution.

The ratios of the gearing employed cause the disc 21 to make one complete revolution for one inch movement of the tape.

The counter will record measurement up to one inch in thousandths of an inch as a result of the drive from the motor: whole inches may be indicated on an independent section of the counter (or on a seperate counter if preferred) by suitable gearing 30, 31 direct from the drum itself. Thus any measurement may be indicated in the time taken by the motor to restore the disc to its zero position, which, with the gearing employed in this example, is always less than the time taken for the motor to make 50 turns after the tape has ceased moving: as the point of equilibrium cannot require more than half a complete turn of the disc 21, the disc will always take the shortest course back to the equilibrium position according to whether the light beam is interrupted or not.

I claim:
1. Displacement indicating apparatus comprising:
    a member mounted for rotation in correspondence with a displacement to be indicated,
    a differential assembly comprising two outer geared components, and a centre geared component which is in geared engagement with the two outer components,
    means coupling the member and the centre component for rotation together,
    a motor drivingly coupled to rotate one outer component, and
    control means responsive to rotation of the other component from a datum position and operative to control the motor to drive the said one outer component continuously in such direction as tends to bring the other outer component back to the datum position, the length of the angular movement of the said one outer component providing a continuous measure of the displacement.

2. Apparatus according to claim 1, including digital counter means connected to be driven by, and to indicate the length of angular movement of, the said other outer component.

3. Apparatus according to claim 2, including further digital counter means and means connecting the further digital counter means to be driven directly by the said member whereby to indicate the said displacement, the digital display of the further digital counter means representing predetermined units of displacement and the digital display of the first-mentioned digital counter means representing fractions of the units.

4. Apparatus according to claim 3, in which the two digital counter means are mounted in a common housing.

5. Apparatus according to claim 1, in which the motor is an electric motor and in which the control means comprises:
   a photo-sensitive device,
   means establishing a light path directed to the photo-sensitive device,
   light controlling means carried by the said other outer component and arranged to intercept the light path whereby the light falling on the photo-sensitive device is dependent on the position of the said other outer component, and
   circuit means connecting the photo-sensitive device to control the motor.

6. Apparatus according to claim 5, in which the light controlling means blocks the light path over 180° of a revolution of the said other outer component in one direction from the datum position and opens the light path for 180° of a revolution in the opposite direction from the datum position.

7. Apparatus according to claim 6, in which the light controlling means comprises an opaque disc carried and rotated by the said other outer component, the disc having a cutaway portion of 180° angular length.

References Cited
UNITED STATES PATENTS

| | | | |
|---|---|---|---|
| 2,782,515 | 2/1957 | Mayes | 318—8 X |
| 2,898,531 | 8/1959 | Gray | 318—323 X |
| 3,135,903 | 6/1964 | Tomek | |

THOMAS E. LYNCH, Primary Examiner

U.S. Cl. X.R.

318—640, 8